US007797692B1

(12) United States Patent
Czajkowski

(10) Patent No.: US 7,797,692 B1
(45) Date of Patent: Sep. 14, 2010

(54) ESTIMATING A DOMINANT RESOURCE USED BY A COMPUTER PROGRAM

(75) Inventor: Grzegorz J. Czajkowski, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1160 days.

(21) Appl. No.: 11/433,657

(22) Filed: May 12, 2006

(51) Int. Cl.
G06F 9/44 (2006.01)
(52) U.S. Cl. .................. 717/161; 717/160; 717/150; 717/151; 717/154; 717/155; 712/241; 712/244; 713/502; 718/102; 718/104
(58) Field of Classification Search .............. 717/150, 717/151, 153, 155, 156, 160, 161, 154, 146, 717/124, 149; 718/102, 104; 709/201; 712/241, 712/244; 713/502
See application file for complete search history.

(56) References Cited

U.S. PATENT DOCUMENTS

| 4,763,255 | A  | * | 8/1988  | Hopkins et al. | 717/153 |
|---|---|---|---|---|---|
| 4,782,444 | A  | * | 11/1988 | Munshi et al. | 717/153 |
| 5,386,562 | A  | * | 1/1995  | Jain et al. | 717/160 |
| 5,713,010 | A  | * | 1/1998  | Buzbee et al. | 717/124 |
| 5,734,908 | A  | * | 3/1998  | Chan et al. | 717/154 |
| 5,764,984 | A  | * | 6/1998  | Loucks | 719/319 |
| 5,774,725 | A  | * | 6/1998  | Yadav et al. | 717/135 |
| 5,819,088 | A  | * | 10/1998 | Reinders | 717/149 |
| 5,835,776 | A  | * | 11/1998 | Tirumalai et al. | 717/161 |
| 5,987,256 | A  | * | 11/1999 | Wu et al. | 717/146 |
| 6,286,135 | B1 | * | 9/2001  | Santhanam | 717/146 |
| 6,341,371 | B1 | * | 1/2002  | Tandri | 717/158 |
| 6,732,124 | B1 | * | 5/2004  | Koseki et al. | 707/202 |
| 6,938,249 | B2 | * | 8/2005  | Roediger et al. | 717/160 |
| 7,051,316 | B2 | * | 5/2006  | Charisius et al. | 717/103 |
| 7,219,347 | B1 | * | 5/2007  | Waddington | 718/104 |
| 7,565,659 | B2 | * | 7/2009  | Day et al. | 718/108 |
| 7,657,570 | B2 | * | 2/2010  | Wang et al. | 1/1 |
| 2002/0029231 | A1 | * | 3/2002  | Aptus et al. | 707/513 |
| 2002/0194251 | A1 | * | 12/2002 | Richter et al. | 709/105 |
| 2003/0097652 | A1 | * | 5/2003  | Roediger et al. | 717/160 |
| 2004/0122815 | A1 | * | 6/2004  | Wang et al. | 707/4 |
| 2004/0237076 | A1 | * | 11/2004 | Vedaraman et al. | 717/160 |
| 2005/0108720 | A1 | * | 5/2005  | Cervini | 718/105 |
| 2005/0240896 | A1 | * | 10/2005 | Wu et al. | 717/100 |

(Continued)

OTHER PUBLICATIONS

Title: Hierarchical scheduling in high level synthesis using resource sharing across nested loops author: Ghosh, A.et al; Source: IEEE, Publication Year: 1999.*

(Continued)

*Primary Examiner*—Chameli C Das
(74) *Attorney, Agent, or Firm*—Park, Vaughan & Fleming LLP

(57) ABSTRACT

A system that estimates a dominant computational resource which is used by a computer program. During operation, for each basic block in the computer program, the system determines a nesting level for the basic block. Next, the system selects basic blocks with nesting levels greater than a specified threshold. For each selected basic block, the system analyzes the basic block to estimate the dominant computational resource used by the basic block. The system then uses the estimated dominant computational resources for the selected basic blocks to estimate the dominant computational resource for the computer program.

14 Claims, 3 Drawing Sheets

U.S. PATENT DOCUMENTS

| | | | | |
|---|---|---|---|---|
| 2006/0004996 | A1* | 1/2006 | Gonion | 712/241 |
| 2006/0048123 | A1* | 3/2006 | Martin | 717/160 |
| 2006/0053410 | A1* | 3/2006 | Charisius et al. | 717/109 |
| 2006/0064415 | A1* | 3/2006 | Guyon et al. | 707/6 |
| 2006/0064692 | A1* | 3/2006 | Sanchez et al. | 718/100 |
| 2006/0248520 | A1* | 11/2006 | Kawabata et al. | 717/160 |
| 2007/0192285 | A1* | 8/2007 | Wang et al. | 707/2 |
| 2008/0162909 | A1* | 7/2008 | Komatsu et al. | 712/241 |
| 2008/0222623 | A1* | 9/2008 | Eichenberger et al. | 717/160 |

OTHER PUBLICATIONS

Title: Static scheduling of uniform nested loops author: Chao, L.-F et al, source: IEEE, Publication Year: 1993.*

* cited by examiner

```
main(...) {
  while (...) {
    x = y + z;
    foo(...);
  }
} foo(...) {
  for (...) {
    printToConsole(...);
  }
}
```

FIG. 2A

```
main() {
  for (...)
    for (...)
      for (...) {
        B
      }
    }
  }
}
```

FIG. 2B

ESTIMATING A DOMINANT RESOURCE USED BY A COMPUTER PROGRAM

BACKGROUND

1. Field of the Invention

The present invention relates to techniques for balancing the use of computational resources within a multi-computer system. More specifically, the present invention relates to a method and apparatus for estimating a dominant computational resource used by a computer program.

2. Related Art

Many organizations maintain large "server farms," which are capable of executing thousands of programs simultaneously. For example, large web sites and interne portal sites, such as search engines and news sites, typically provide hundreds or thousands of servers to respond to user requests. During this process, a load balancer is typically used to schedule requests onto machines with available computational resources. In order to make good scheduling decisions, it is desirable for the load balancer to know what computational resources are required by specific programs so that the programs can be scheduled to run on machines on which these computational resources are available.

For example, consider four programs, P1, P2, P3, and P4, wherein P1 and P2 are CPU-bound and that P3 and P4 have large memory footprints but do not use significant amount of processor time. In this case, scheduling P1 and P3 to execute on the same server while running P2 and P4 together on a different server results in a more efficient utilization of computational resources and results in better quality of service (QOS) than collocating the two CPU-bound programs, P1 and P2, on one server, and collocating the other memory-intensive programs, P3 and P4, on another server.

On the other hand, if the load balancer receives an unknown program about which it has no information, the load balancer does not know which computational resources will be used by the program. Consequently, the load balancer cannot efficiently schedule the program on a server within the server farm.

Hence, what is needed is a method and an apparatus for estimating the dominant computational resource of a program to facilitate scheduling the program to run on a specific machine in a server farm.

SUMMARY

One embodiment of the present invention provides a system that estimates a dominant computational resource which is used by a computer program. During operation, for each basic block in the computer program, the system determines a nesting level for the basic block. Next, the system selects basic blocks with nesting levels greater than a specified threshold. For each selected basic block, the system analyzes the basic block to estimate the dominant computational resource used by the basic block. The system then uses the estimated dominant computational resources for the selected basic blocks to estimate the dominant computational resource for the computer program.

In a variation on this embodiment, using the dominant computational resources for the selected basic blocks to estimate the dominant computational resource for the computer program involves aggregating the estimates for the selected basic blocks.

In a further variation, while aggregating the estimates for the selected basic blocks, the system weights basic blocks with a maximum nesting level more heavily than basic blocks with a less than maximum nesting level.

In a variation on this embodiment, the system uses the estimated dominant computational resource for the computer program to schedule the computer program to run on a specific node in a multi-computer system, wherein the computer program is scheduled on the specific node so that resource utilization is well balanced across nodes of the multi-computer system.

In a variation on this embodiment, the computational resources can include CPU resources, memory resources, network resources, and disk resources.

In a variation on this embodiment, the nesting level is zero for each basic block of the main function that is not within a loop.

In a variation on this embodiment, if a basic block contains a method call, the system first determines the nesting level for each basic block within the method call. The system then increases the nesting level of each basic block within the method call by the nesting level of the basic block containing the method call.

In a variation on this embodiment, if a method is recursively called, the nesting level of basic blocks within the method are incremented by a specified value, typically by one.

BRIEF DESCRIPTION OF THE FIGURES

FIG. 2A presents an exemplary block of code in accordance with an embodiment of the present invention.

FIG. 2B presents another exemplary block of code in accordance with an embodiment of the present invention.

Table 1 presents exemplary code illustrating the effect of coding style on the estimation of the dominant computational resource for a computer program in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Overview

One embodiment of the present invention estimates the dominant computational resource (e.g., main memory, network, disk, and CPU time) for an arbitrary computer program. Once the dominant computational resource for the arbitrary computer program is estimated, the computer program can be scheduled to execute on a specific server within the server farm so that the resource utilization is substantially optimized across the server farm. Note that the arbitrary computer program can be a query encoded as a computer program or a "searchlet" (a searching agent) sent to a data repository.

Figure 1:
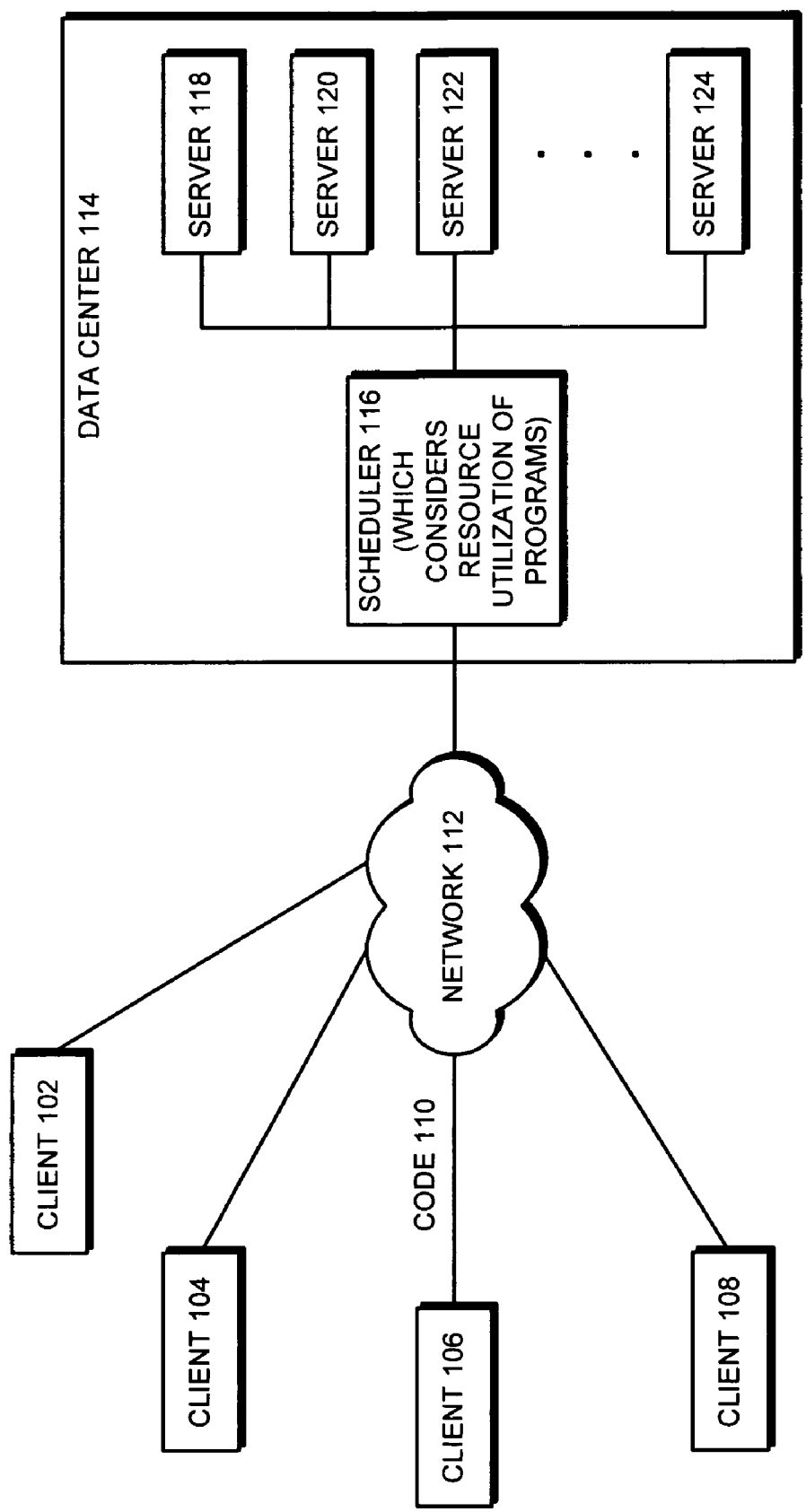
FIG. 1 present a block diagram of a multi-computer system coupled to clients through a network in accordance with an embodiment of the present invention.

FIG. 1 present a block diagram of a multi-computer system coupled to clients through a network in accordance with an embodiment of the present invention. As illustrated in FIG. 1, clients 102-108 are coupled to servers 118-124 through network 112, and servers 118-124 reside in data center 114. In general, client 106 submits code 110 to scheduler 116 through network 112, and scheduler 116 uses information about the dominant computational resource for code 110 while scheduling code 110 to execute on a specific server, so that resource utilization is well balanced across the servers within data center 114.

Network 112 can generally include any type of wired or wireless communication channel capable of coupling together computing nodes. This includes, but is not limited to, a local area network, a wide area network, or a combination of networks. In one embodiment of the present invention, network 112 includes the Internet.

Clients 102-108 can generally include any node on a network including computational capability and including a mechanism for communicating across the network.

Servers 118-124 can generally include any nodes on a computer network including a mechanism for servicing requests from a client for computational and/or data storage resources.

The system can analyze a number of different types of code to determine the dominant computational resource for a program. For example, the system can analyze: (1) source code for the program, (2) an intermediate representation of the program, or (3) executable code for the program. (Note that this executable code can include a platform-independent bytecode, such as JAVA™ (JAVA is a trademark of Sun Microsystems of Santa Clara, Calif.) bytecode.)

In one embodiment of the present invention, determining the dominant resource of a program involves two steps: (1) identifying the most-nested basic blocks of the program, and (2) analyzing the resource requirements of the most-nested basic blocks. In this embodiment, the difficult problem of analyzing the whole computer program is simplified and the much more manageable task of analyzing a small set of basic blocks is performed instead.

One embodiment of the present invention determines the most-nested basic block of the computer program by starting from the entry point of the computer program. For example, FIG. 2A illustrates an exemplary block in accordance with an embodiment of the present invention. In the code presented in FIG. 2A, the most-nested basic block is the body of the "for loop" block within the method foo( ). Note that the main( ) method is the entry point.

One embodiment of the present invention analyzes the most-nested basic block (or basic blocks, if there are multiple basic blocks at the same nesting level) to determine the dominant computational resource consumed by the basic block. If the basic block is long and includes arithmetic operations, the basic block is likely to be CPU-intensive. On the other hand, if the basic block performs many memory allocations, the basic block is likely to generate large memory footprint. Furthermore, if the basic block performs network operations, the basic block is likely to consume a lot of network bandwidth. Note that this analysis can be extended to include other computational resources, such as disk resources.

The rationale behind this technique is that the most-nested basic block is likely to be a good predictor of the behavior of the program since the most-nested basic block is likely to be executed more frequently than other basic blocks.

Note that the ability to determine the dominant resource helps primarily in scheduling a job for the first time. Hence, in one embodiment of the present invention, if the computer program has been executed one or more times, the resource-utilization information obtained from prior runs can be used to improve subsequent scheduling decisions.

Estimating the Dominant Computational Resource

Figure 3:
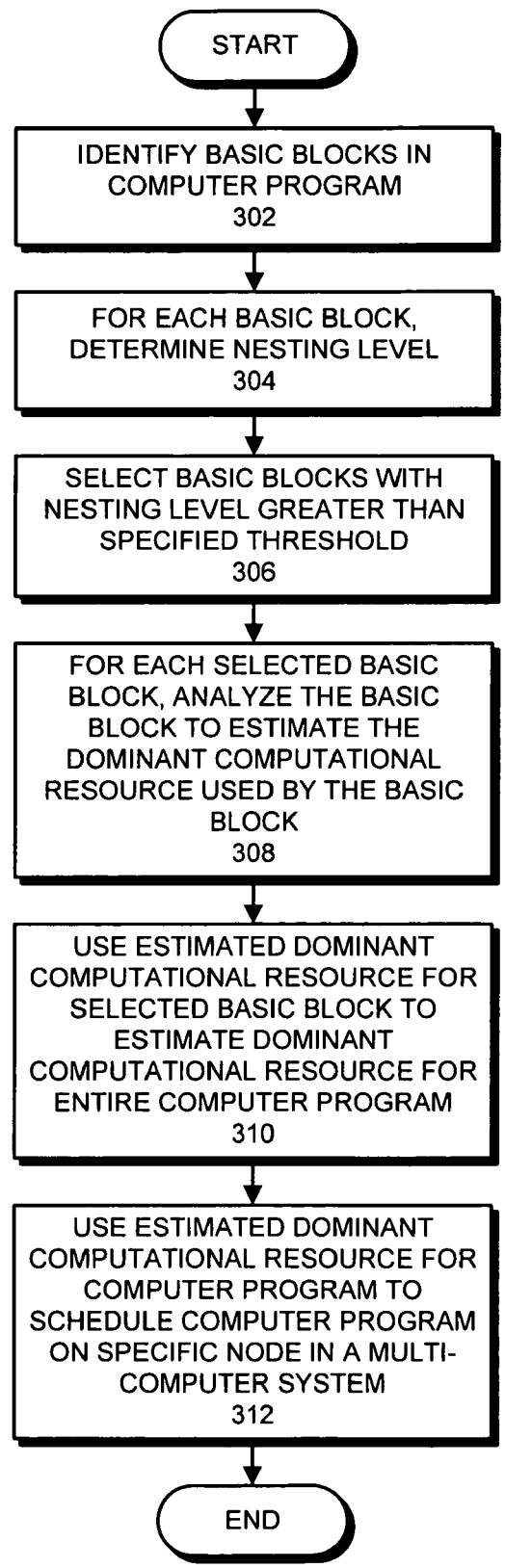
FIG. 3 presents a flow chart illustrating the process of estimating a dominant computational resource for a computer program in accordance with an embodiment of the present invention.

FIG. 3 presents a flow chart illustrating the process of estimating a dominant computational resource for a computer program in accordance with an embodiment of the present invention. First, the system identifies basic blocks within the computer program (step 302). Next, for each basic block, the system determines the nesting level for the basic block (step 304). In one embodiment of the present invention, this involves starting with the entry point to the program. Next, each basic block in the code that is invoked first (e.g., main( ) in standalone C/C++/JAVA™ (JAVA is a trademark of Sun Microsystems of Santa Clara, Calif.), service( ) or doGet( ) for servlets, etc.) is assigned a nesting level (NL). For example, a basic block that is not in any loop will get a NL=0, while a basic block which is nested in one or more loops will receive a nesting level which is consistent with the looping structure. For example, in the exemplary code presented in FIG. 2B, the basic block B is assigned a nesting level of 3.

Next, the system selects basic blocks with a nesting level greater than a specified threshold (step 306). For each of these selected basic blocks, the system analyzes the basic block to estimate the dominant computational resource used by the basic block (step 308).

Next, the system uses the estimated dominant computational resources for the selected basic blocks to estimate the dominant computational resource for the entire computer program (step 310). In one embodiment of the present invention, this involves aggregating the estimates for the selected basic blocks. In one embodiment of the present invention, while aggregating the estimates for the selected basic blocks, the system weights basic blocks with a maximum nesting level more heavily than basic blocks with a less-than-maximum nesting level.

The system then uses the estimated dominant computational resource for the computer program to schedule the computer program to run on a specific node in a multi-computer system. This involves scheduling the computer program so that resource utilization is well balanced across nodes of the multi-computer system (step 312).

In one embodiment of the present invention, if a basic block with a NL=X contains a method call, the nesting level of each basic block within the method call is increased by X.

In one embodiment of the present invention, if a method call is recursively invoked, the NL of each basic block within the method call is incremented by a specified value, typically by one. Note that this rule is derived from the fact that recursion can be emulated by iteration.

In one embodiment of the present invention, if the computer program is written in an object-oriented language which supports virtual method calls, the analysis is conservative with respect to the virtual method calls. In this case, each call site is treated as if each method that can be used there will be used there.

Note that each update to the nesting level for basic block can cause cascading changes to the nesting level within other basic blocks. This procedure of computing nesting levels of basic blocks terminates when there are no more rules to apply and the whole program has been analyzed.

The present invention predicts the dominant resource accurately for many programs. However, there are programs whose most-nested basic block is not a necessarily a good predictor of resource utilization. Hence, one embodiment of the present invention considers both basic blocks with maximum NL (MNL) and basic blocks with NL=(MNL−1). In this embodiment, the system analyzes the collective resource consumption of both of these types of basic blocks. In another embodiment of the present invention, all basic blocks with NL=(MNL−1) and NL=MNL are considered, but the latter basic blocks are given more weight.

Note that certain compiler optimizations, such as loop unrolling, can change the nesting structure of the original computer program. Thus, the present invention may produce different results for optimized code.

The computational resource analysis can be sensitive to the coding style. For example, consider two methods that send a text file over a socket which are illustrated in Table 1.

TABLE 1

| Socket Code |
| --- |
| (a) for each line 1 in the file socket.send(1); |
| (b) string s = empty_string; for each line 1 in the file s.append(1); socket.send(s); |

The analysis of the code in (a) indicates that the code is network-centric whereas the analysis of the code in (b) indicates that the code is more CPU-bound. Both of these statements are true. Hence, one embodiment of the present invention informs a programmer, during compilation time, as to which computational resource is likely to be dominant for the computer program. This enables the programmer to tune the code so that the computer program utilizes certain resources more sparingly than others.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for estimating a dominant computational resource which is used by a computer program, comprising:
   calculating, at a computer, a nesting level for a basic block in the computer program; determining whether the nesting level is greater than a specified threshold;
   in response to the nesting level being greater than the specified threshold, analyzing the basic block to determine a dominant computational resource used by the basic block;
   estimating the dominant computational resource used by the computer program, which involves aggregating the determined dominant computational resources used by a plurality of basic blocks having nesting levels greater than the specified threshold; and
   scheduling the computer program to run on a corresponding node in a multi-computer system based on the estimated dominant computational resource used by the computer program.

2. The method of claim 1, wherein aggregating the dominant computational resources used by the basic blocks involves weighting basic blocks with a maximum nesting level more heavily than basic blocks with a less than maximum nesting level.

3. The method of claim 1, wherein the computational resources can include:
   CPU resources;
   main memory resources (RAM);
   network resources; and
   disk resources.

4. The method of claim 1, wherein the nesting level is zero for each basic block of the main function that is not within a loop.

5. The method of claim 1, wherein if a basic block contains a method call, for each basic block within the method call, the method further comprises:
   determining an initial nesting level for the basic block within the method call; and
   calculating a final nesting level of the basic block within the method call by adding the nesting level of the basic block containing the method call to the initial nesting level.

6. The method of claim 1, wherein if a method is recursively called, the nesting level of basic blocks within the method are incremented by a specified value.

7. A non-transitory computer-readable storage medium storing instructions executed by a computer cause the computer to perform a method for estimating a dominant computational resource which is used by a computer program, wherein the method comprises:
   calculating a nesting level for a basic block in the computer program; determining whether the nesting level is greater than a specified threshold;
   in response to the nesting level being greater than the specified threshold, analyzing the basic block to determine a dominant computational resource used by the basic block;
   estimating the dominant computational resource used by the computer program, which involves aggregating the determined dominant computational resources used by a plurality of basic blocks having nesting levels greater than the specified threshold; and
   scheduling the computer program to run on a corresponding node in a multi-computer system based on the estimated dominant computational resource used by the computer program.

8. The non-transitory computer-readable storage medium of claim 7, wherein aggregating dominant computational resources used by the basic blocks involves weighting basic blocks with a maximum nesting level more heavily than basic blocks with a less than maximum nesting level.

9. The non-transitory computer-readable storage medium of claim 7, wherein the computational resources can include:
   CPU resources;
   main memory resources (RAM);
   network resources; and
   disk resources.

10. The non-transitory computer-readable storage medium of claim 7, wherein the nesting level is zero for each basic block of the main function that is not within a loop.

11. The non-transitory computer-readable storage medium of claim 7, wherein if a basic block contains a method call, for each basic block within the method call, the method further comprises:

determining an initial nesting level for the basic block within the method call; and calculating a final nesting level of the basic block within the method call by adding the nesting level of the basic block containing the method call to the initial nesting level.

12. The non-transitory computer-readable storage medium of claim 7, wherein if a method is recursively called, the nesting level of basic blocks within the method are incremented by a specified value.

13. A multi-computer system that estimates a dominant computational resource which is used by a computer program, comprising:

a set of computational nodes;

a computational resource estimation mechanism configured to:

calculate a nesting level for a basic block in the computer program;

determine whether the nesting level is greater than a specified threshold;

in response to the nesting level being greater than the specified threshold, analyze the basic block to determine a dominant computational resource used by the selected basic blocks; and estimate the dominant computational resource used by the computer program, which involves aggregating the determined dominant computational resources used by a plurality of basic blocks having nesting levels greater than the specified threshold; and a scheduling mechanism configured to schedule the computer program to run on a corresponding computational node based on the estimated dominant computational resource used by the computer program.

14. The multi-computer system of claim 13, wherein while aggregating the dominant computational resources used by the basic blocks, the computational resource estimation mechanism is configured to weight basic blocks with a maximum nesting level more heavily than basic blocks with a less than maximum nesting level.

* * * * *